United States Patent
Yang et al.

(10) Patent No.: US 8,041,845 B2
(45) Date of Patent: Oct. 18, 2011

(54) METHOD FOR DETECTING DIGITAL VIDEO INTERFACE OFF-LINE MODE AND ASSOCIATED RECEIVER

(75) Inventors: Chia-Ming Yang, Hsinchu (TW); Huimin Tsai, Hsinchu (TW)

(73) Assignee: MStar Semiconductor, Inc., ChuPei (TW)

( * ) Notice: Subject to any disclaimer, the term of this patent is extended or adjusted under 35 U.S.C. 154(b) by 381 days.

(21) Appl. No.: 12/115,239

(22) Filed: May 5, 2008

(65) Prior Publication Data

US 2008/0204561 A1    Aug. 28, 2008

Related U.S. Application Data

(63) Continuation-in-part of application No. 11/055,691, filed on Feb. 11, 2005, now abandoned.

(51) Int. Cl.
*G06F 3/00* (2006.01)
*H04N 5/63* (2006.01)

(52) U.S. Cl. .......................... 710/14; 348/730

(58) Field of Classification Search ............. 710/14
See application file for complete search history.

(56) References Cited

U.S. PATENT DOCUMENTS

| | | | | |
|---|---|---|---|---|
| 5,736,873 A | * | 4/1998 | Hwang | 327/41 |
| 5,745,105 A | * | 4/1998 | Kim | 345/212 |
| 5,808,693 A | * | 9/1998 | Yamashita et al. | 348/554 |
| 5,886,689 A | * | 3/1999 | Chee et al. | 345/212 |
| RE37,551 E | * | 2/2002 | Shiki | 345/87 |
| 6,948,081 B2 | * | 9/2005 | Lee | 713/310 |
| 2002/0039153 A1 | * | 4/2002 | Yoo | 348/730 |
| 2006/0209880 A1 | * | 9/2006 | Chang et al. | 370/464 |

FOREIGN PATENT DOCUMENTS

| | | |
|---|---|---|
| CN | 1304237 A | 7/2001 |
| CN | 1523875 A | 8/2004 |
| WO | 2004/107746 A1 | 12/2004 |

* cited by examiner

*Primary Examiner* — Henry Tsai
*Assistant Examiner* — Titus Wong
(74) *Attorney, Agent, or Firm* — Kirton & McConkie; Evan R. Witt

(57) ABSTRACT

A TMDS receiver includes a plurality of data channels, a clock channel, and an off-line mode detector. Each data channel receives a video signal and the clock channel receives a clock signal. Each data channel comprises a channel decoder for decoding the signals received by the corresponding receiving channel. The off-line mode detector detects an off-line mode detector, and then turns on a plurality of first data channels for a first predetermined period to determine an operation mode of video signal transmitted on said first data channels if the activity of the clock signal is valid. The off-line mode detector also activates a plurality of second data channels among the plurality of data channels according to the operation mode if the operation mode is determined as valid.

22 Claims, 4 Drawing Sheets

METHOD FOR DETECTING DIGITAL VIDEO INTERFACE OFF-LINE MODE AND ASSOCIATED RECEIVER

CROSS REFERENCE TO RELATED APPLICATION

This is a continuation-in-part of a U.S. patent application Ser. No. 11/055,691, filed on Feb. 11, 2005.

BACKGROUND OF THE INVENTION

1. Field of the Invention

The present invention relates to digital video interface, and more specifically, to a method for detecting the digital video interface off-line mode and associated receiver.

2. Description of the Prior Art

In general, the cathode ray tube (CRT) display is a stereotype of the analog video display device and the liquid crystal display (LCD) is a stereotype of the digital video display device. Meanwhile, the digital video display device is capable of receiving either analog video signals or digital video signals from a signal source such as a graphic card of the computer but eventually displays digital video signals on the screen.

A called "Digital Visual Interface (DVI)" standard, which has been announced by the Digital Display Working Group (DDWG), spreads a high-speed digital transmission technology for visual display signals. The digital video interface complied with the DVI standard is primarily focused on providing a higher compatible connection between a computer (e.g. workstation, desktop, laptop, etc.) and its different display devices (e.g. CRT, LCD, projector, etc.). In a digital video interface compliant host system, either a digital only interface or a combined analog and digital interface may be utilized.

As known, conventional host systems and liquid crystal displays all are inherently digital devices. The video interface for a CRT display requires a digital to analog converter (DAC) to convert the innate digital signal into the analog signal. However, a LCD may further require an analog to digital converter (ADC) for receiving and converting the analog video signal into the digital video signal. The requirements of DAC of the video interface and ADC of the liquid crystal display do not only result in increasing the cost but also degradation of the video quality during a plurality of conversions between the analog and digital signals.

Thus, the digital video interface provided with solutions of complete digital transmission becomes a popular video connection standard. Conventionally, a mode detection circuit is adopted to frequently detect the current mode of the video signals received by a transmission minimized differential signaling (TMDS) receiver. In a digital video interface system, Sync information is encoded in the data stream and TMDS receiver needs to use a receiver and decoder to decode the Sync information for mode detection. Even in off-line mode, without displaying any input image but monitoring the input signal, the prior art needs to turn on all TMDS receivers and decode the data continuously for mode detection. The full operation of all channels and the frequent detection of the conventional mode detection circuit causes high power consumption and heat dissipation.

SUMMARY OF INVENTION

It is therefore an objective of the claimed invention to provide a method for detecting digital video interface off-line mode and associated TMDS receiver in order to reduce the power consumption of a digital video interface system, and raise system performance.

The TMDS receiver comprises a plurality of data channels, a clock channel, and an off-line mode detector. Each data channel receives a video signal and the clock channel receives a clock signal. Each data channel comprises a channel decoder for decoding the signals received by the corresponding data channel. The off-line mode detector couples with the clock channel and the decoders. The off-line mode detector detects the activity of the clock signal, and then turns on a first data channel of the plurality of data channels for a first predetermined period to determine an operation mode of video signal transmitted on said first data channels if the activity of the clock signal is valid. The off-line mode detector comprises a mode detector, a clock detector, and a power down controller. The power down controller is coupled to the mode detector and the clock detector. The power down controller enables the mode detector to determine the operation mode of the video signal, and then the power down controller turns off all decoders, data channels, and the clock channel for a second predetermined period when the operation mode is determined as invalid. Preferably, the second predetermined period is much longer than the first predetermined period.

It is an advantage of the claimed invention that the method for digital video interface off-line mode detection is to reduce the power consumption and failures of a digital video interface system such as a digital video interface chip. The method for digital video interface off-line mode detection of the claimed invention does not need to detect the digital video interface mode all the time but just detecting once in a predetermined period. Hence, the total time of mode detection can be minimized in order to diminish the power consumption of the digital video interface chip.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION

Figure 1:
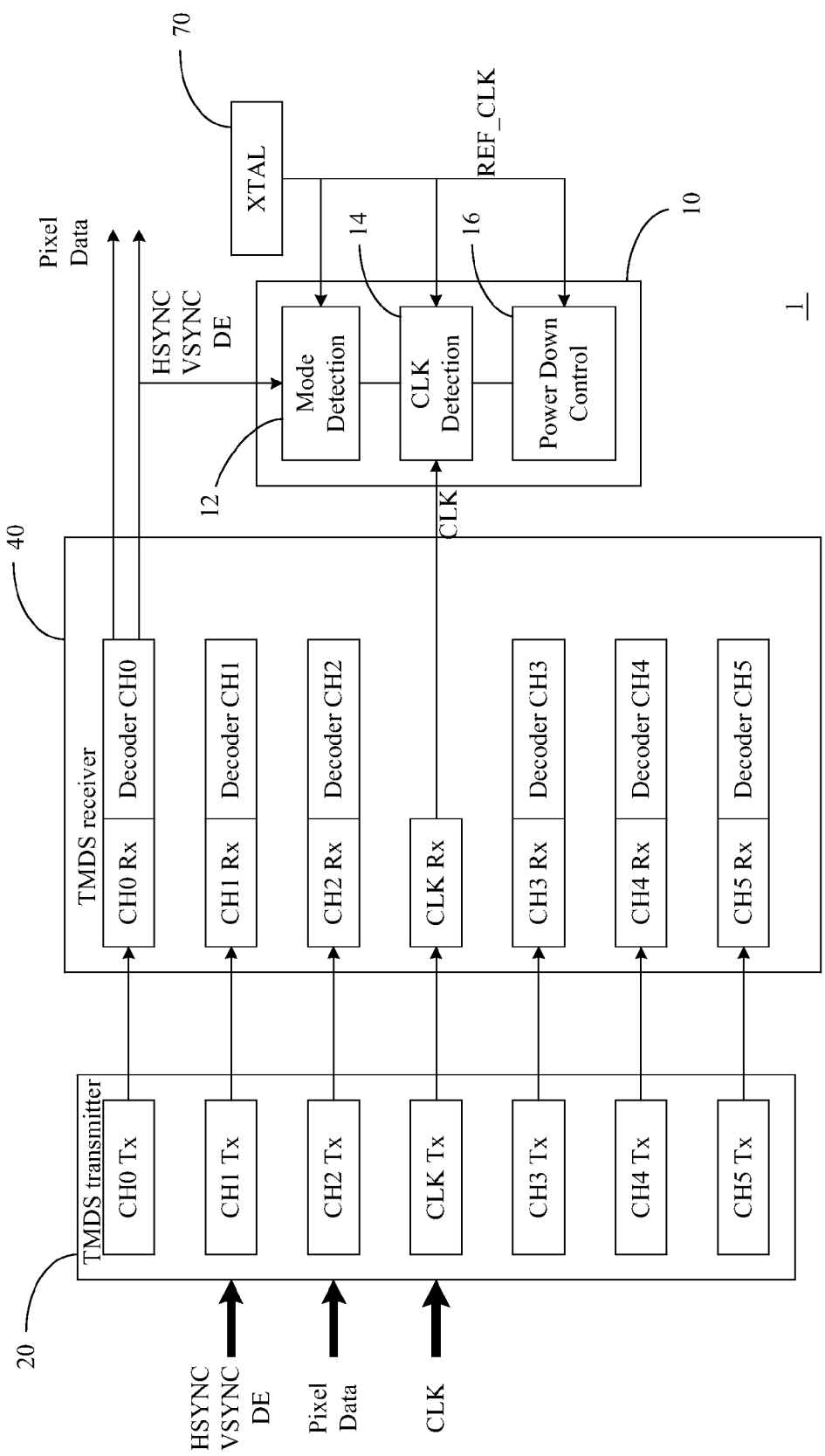
FIG. 1 is a block diagram of a digital video interface system comprising a TMDS receiver with the off-line mode detector in accordance with a preferred embodiment of the present invention.

FIG. 1 shows a block diagram of a digital video interface system 1 including a transmission minimized differential signaling (TMDS) transmitter 20, a TMDS receiver 40, and a crystal oscillator XTAL 70. Meanwhile, the TMDS receiver 40 according to a preferred embodiment of the present invention, receives a plurality of signals, for example, including a horizontal synchronization (HSYNC) signal, a vertical synchronization (VSYNC) signal, a display enable (DE) signal, a clock (CLK) signal and Pixel Data signal, which are transmitted from the TMDS transmitter 20.

The TMDS transmitter 20 comprises a plurality of encoders and transmitting channels. As shown in FIG. 1, each transmitting channel TX_CHn transmits the signal for channel n, wherein "n" is an integer from 0 to 5, and a transmitting clock channel Tx_CLK transmits a CLK signal to TMDS receiver 40. Meanwhile, the HSYNC, VSYNC, DE, and Pixel Data signals are transmitted by the TMDS transmitter 20.

On the other side, the TMDS receiver 40 comprises a plurality of data channels for receiving the signals from the transmitting channels. For example, a data channel RX_CH0 receives the signal from the transmitting channel TX_CH0, a data channel RX_CH1 receives the signal from the transmitting channel TX_CH1, and a receiving clock channel RX_CLK receives the CLK signal from the transmitting clock channel TX_CLK. Each data channel RX_CHn comprises a channel decoder CHn for decoding the signals received by the corresponding data channel. For example, the channel decoder CH0 decodes the signal from the data channel RX_CH0, the channel decoder CH1 decodes the signal from the data channel RX_CH1 and so on. The channel decoders CH0~CH5 respectively output the decoded signals HSYNC, VSYNC, DE and Pixel Data. The crystal oscillator XTAL 70 generates a reference clock signal REF_CLK.

The TMDS receiver 40 further comprises an off-line mode detector 10 that includes a mode detector 12, a CLK detector 14 and a power down controller 16. First of all, the CLK detector 14 receives the clock signal CLK from the data channel RX_CLK and determines whether the CLK signal is valid and correct or not. For example, roughly count the transitions of the CLK signal in a predetermined period, in order to determine whether the frequency of the CLK signal is operated within a desired frequency range such as above 10 MHz or 25 MHz. If the CLK signal is valid and correct, the power down controller 16 turns on the data channel RX_CH0 and decoder CH0 for receiving and decoding the HSYNC and VSYNC signals from the data channel RX_CH0. Oppositely, as soon as the CLK detector 14 does not find out correct CLK signal during said detection, the power down controller 16 preferably powers off the mode detector 12 and all data channels for a predetermined period.

Upon the data channel RX_CH0 is turned on, the mode detector 12 determines the operation mode by monitoring the decoded signals of HSYNC and VSYNC on the data channel RX_CH0 in order to detect the assertion of HSYNC and VSYNC signals for a very short period, e.g. 100 ms. If the frequencies of the HSYNC and VSYNC signals are valid and correct, the power down controller 16 keeps the data channel RX_CH0 active and further activates other data channels depending on the display resolution and the display frequency. For example, the display resolution can be determined by line count or pixel count. It should be noted that there are six transceiving channels in the digital video interface system 1. The data channels RX_CH0 to RX_CH2 transceive the R (red), G (green), and B (blue) signals. Under a low resolution display such as below 1280*1024 and 60 Hz, the data channels RX_CH0 to RX_CH2 are required for display so that the power down controller 16 preferably activates the data channels RX_CH0 to RX_CH2 and deactivates other channels for power saving. Oppositely, under a high resolution display such as 1600*1200 and 70 Hz display, the power down controller 16 activates all data channels RX_CH0 to RX_CH5.

Moreover, if the mode detector 12 does not detect proper HSYNC and VSYNC signals while the CLK detector 14 receives the correct CLK signal, the power down controller 16 preferably deactivates all data channels RX_CH0~RX_CH5. In the preferred embodiment of the present invention, the mode detector 12 can check the status of the channel RX_CH0 in order to determine whether the video signals are valid and correct. It should be noted that the mode detector 12 can also detect any one of the other data channels for the similar activity without departing from the spirit of the invention. For example, but not limited to, the mode detector 12 can detect DE signal in any data channel instead of detecting HSYNC and VSYNC signals in the data channel RX_CH0. Persons skilled in the art can conceive that detection information for HSYNC and VSYNC signals can be obtained through digital processing of DE signal in any data channel. The mode detector 12 and the CLK detector 14 transmit the detection information to the power down controller 16, so that the power down controller 16 controls the power down signals PD0 to PD5 to respectively operate the corresponding data channels of the TMDS receiver 40 (e.g. power on or off) in response to the detection information.

The determination of whether the mode is valid and correct can be implemented by referencing the detection information, including but not limited to the clock frequency, display resolution and display frequency, with a look-up table (not shown), which may prerecord a plurality of valid and correct operation modes. It should be noted that the power down controller 16 can also power down the receiving clock channel RX_CLK for the predetermined period if the mode detector 12 does not find out proper HSYNC and VSYNC signals.

Figure 2:
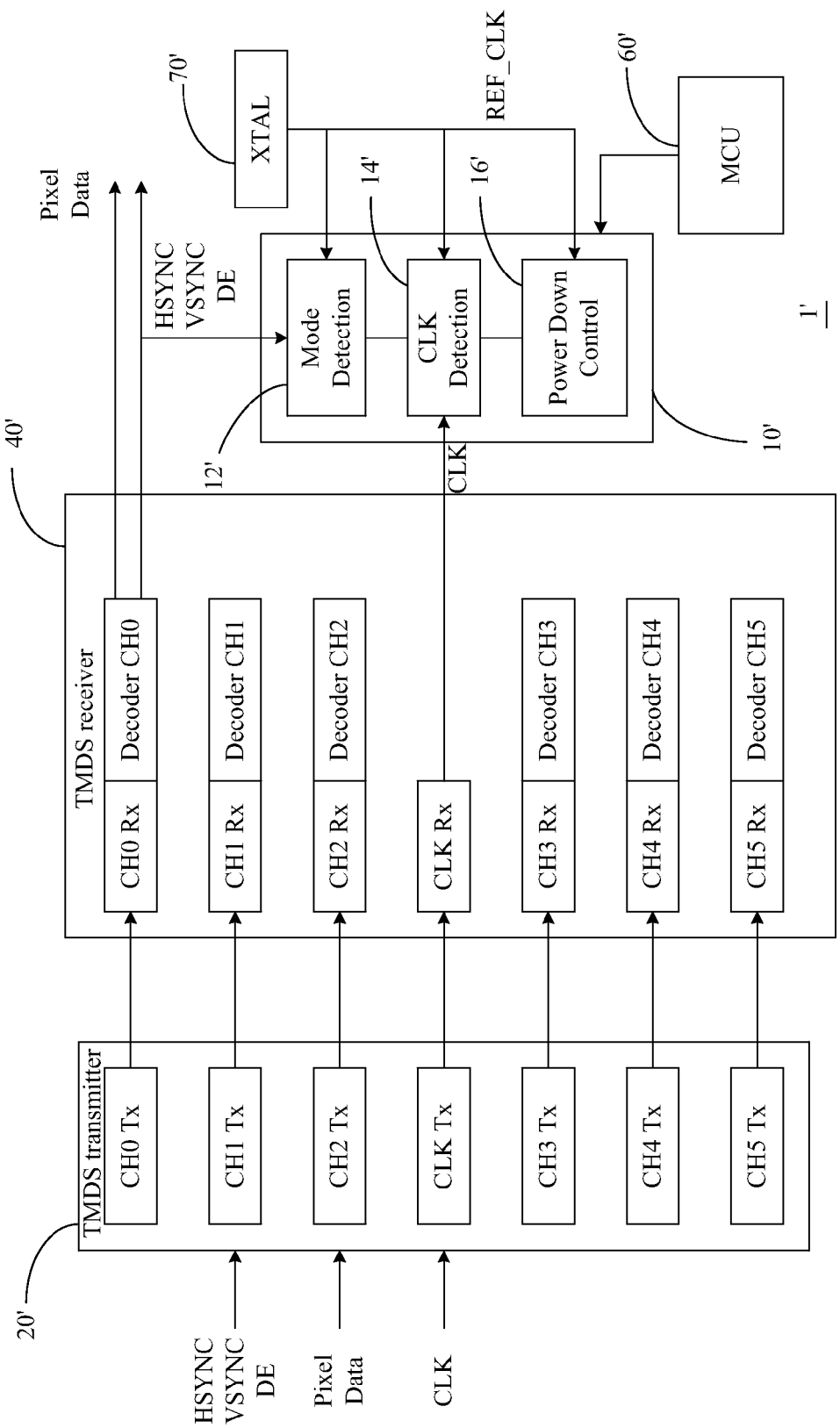
FIG. 2 illustrates a block diagram of the digital video interface system comprising a TMDS receiver according to another embodiment of the present invention.

FIG. 2 illustrates a digital video interface system 1' which is presented with a TMDS receiver 40' according to another embodiment of the present invention. A Digital video interface system 1' comprises a TMDS transmitter 20', a TMDS receiver 40', and a crystal oscillator XTAL 70'. The TMDS transmitter 20' and the crystal oscillator XTAL 70' are identical to the transmitter 20 and the crystal oscillator XTAL 70 of the Digital video interface system 1, respectively. The difference between the first and second embodiments lies in that the latter further comprises a micro controller unit (MCU) 60'. The micro controller unit 60' coordinates the TMDS receiver 40' that incorporates a mode detector 12', a clock detector 14' and a power down controller 16'. The micro controller unit 60' can properly deactivate the off-line mode detector 10' in accordance with the command of user. For instance, the micro controller unit 60' can turn off the TMDS receiver 40' whenever the user defined monitoring period is up.

The off-line mode detector 10' in accordance with the present invention, for example, may periodically determine the operation mode of the digital video signals by detecting HSYNC, VSYNC, DE and Pixel Data signals. The off-line mode detector 10' is able to work independently. For example, the CLK detector 14' preferably detects the CLK signal periodically, and the mode detector 12' can further determine the operation mode of the video signals after the correct clock activity from the TMDS transmitter is detected. The power-down controller 16' determines whether to activate the data channels RX_CH0~RX_CH5 or not, according to the detection information generated from the CLK detector 14' and the mode detector 12'. Thus, the present invention significantly reduces the power consumption of the digital video interface system 1' and improves the durability and performance thereof. Furthermore, the off-line mode detector 10' can be coordinated by a MCU 60' for satisfying the specific requirements from the user.

Figure 3:
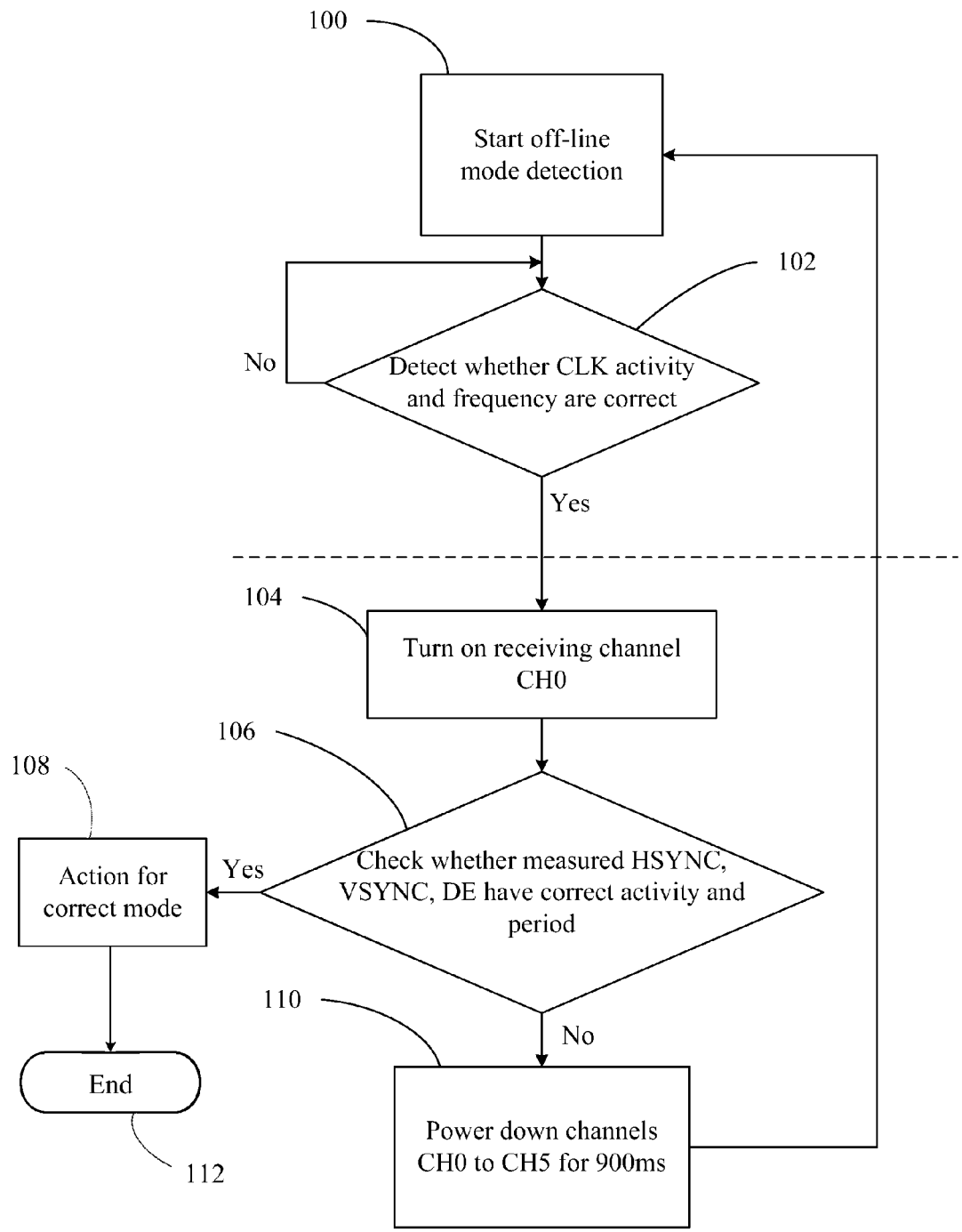
FIG. 3 is a flowchart for detecting the off-line mode of the digital video interface signals according to the present invention.

FIG. 3 shows a flowchart for detecting the off-line mode of the video signal according to the embodiment of the present invention, including the following steps:

Step 100: Start the off-line mode detection.

Step 102: Detect the activity and frequency of RX_CLK signal. If the activity and frequency of CLK signal from the channel RX_CLK is valid and correct, the procedure proceeds to step 104, else return to the step 102. For example, the detection period is 100 ms, which is preferably twice greater than VSYNC period, e.g. 40 ms.

Step 104: Turn on the data channel RX_CH0.

Step 106: Check the activity and period of the HSYNC, VSYNC and DE signals on the data channel RX_CH0. If the modes of these video signals, for example, by detecting HSYNC, VSYNC and DE signals are valid and correct, the procedure proceeds to step 108, else proceeds to the step 110.

Step 108: Activate a plurality of data channels in response to the correct mode to display. The procedure proceeds to step 112

Step 110: Power down the data channels RX_CH0 to RX_CH5 for 900 ms, and then return to the step 100.

Step 112: End.

Figure 4:
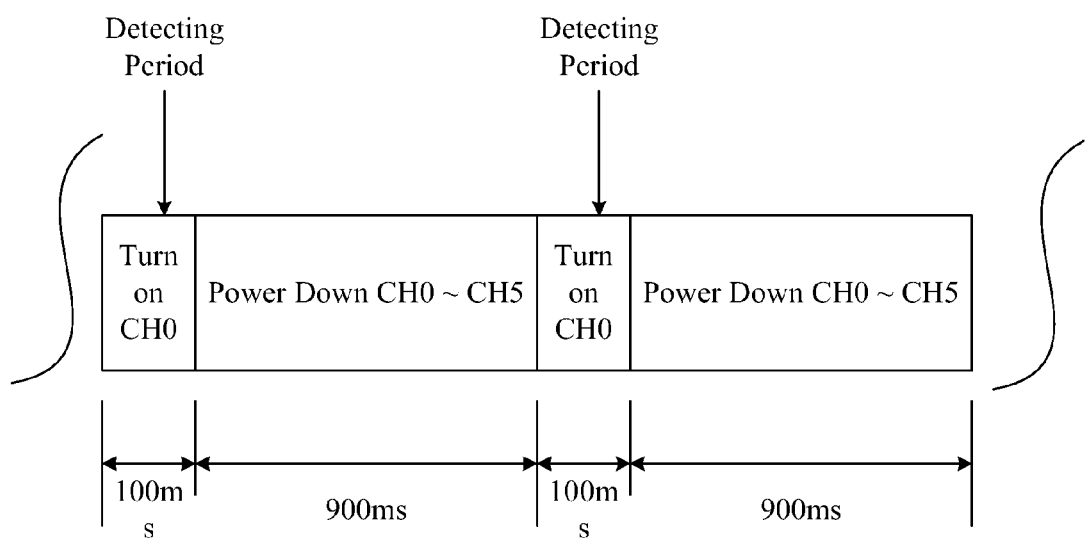
FIG. 4 is a schematic diagram for turning on channel RX_CH0 and powering down digital video interface data channels according to the present invention.

Please further refer to FIGS. 1 and 4. FIG. 4 shows a schematic diagram for turning on the data channel RX_CH0 and then powering down the data channels RX_CH0~RX_CH5, according to the present invention. First of all, the power-down controller 16 turns on the data channel RX_CH0 to facilitate the mode detector 12 determining the operation mode of the data channel RX_CH0 for a short period, e.g. 100 ms (millisecond). As soon as the operation mode is determined as valid and correct, the power-down controller 16 keeps the data channel RX_CH0 activated and further activates necessary data channels. If the operation mode of the data channel RX_CH0 is determined as invalid and incorrect, the power-down controller 16 turns off all data channels RX_CH0~RX_CH5 for a longer period, e.g. 900 ms. In the meantime, the detecting period can be kept as less as possible for saving more power. It should be noted that because the detecting period of the CLK signal is much shorter than of the video signals, such as 1-2 ms in usual conditions, we can neglect the detecting period of the CLK signal.

According to the embodiment of the present invention, although the detecting period of the signals of the channels is set for approximate 100 ms and the power down period is set for approximate 900 ms, each of the periods can be adjustably modified with corresponding to different requirements or situations. In general, the detecting period for the signal mode is preferably twice higher than the period of the signal to be detected. For example, if the minimum signal period for the VSYNC signal is 40 ms, the detecting period for the signal mode is preferably longer than 80 ms. The digital video interface system 1, 1' may be used for video applications such as High-Definition Multimedia Interface (HDMI), and Digital Visual Interface (DVI).

In contrast to the prior art, the method for detecting digital video interface off-line mode in accordance with the present invention does not need to detect the mode of the video signals all the time. The present invention reduces the active time of the digital video interface system such as a digital video interface chip, and it thus reduces the power consumption of the digital video interface chip. For example, the power consumption of mode detection can be significantly reduced to a factor of 1/30 in off-line mode. The lesser operation time and lower power consumption leads to the improvements of the durability and reliability of the digital video interface chip.

Thus, the present invention discloses a method for detecting the digital video interface off-line mode and associated TMDS receiver. The TMDS receiver comprises a plurality of data channels, a clock channel, and an off-line mode detector. Each data channel receives a video signal and the clock channel receives a clock signal. Each data channel comprises a channel decoder for decoding the signals received by the corresponding data channel. The off-line mode detector couples with the clock channel and the decoders. The off-line mode detector detects an activity of the clock signal to determine whether to turn on at least one data channel for a first predetermined period. The off-line mode detector comprises a mode detector, a clock detector, and a power down controller. The power down controller is coupled to the mode detector and the clock detector. The power down controller enables the mode detector to determine the operation mode of the video signal, and then the power down controller turns off all decoders and channels for a second predetermined period when the operation mode is determined as invalid. Preferably, the second predetermined period is much longer than the first predetermined period.

This invention has been described in considerable detail in order to provide those skilled in the digital visual interface art with the information needed to apply the novel principles and to construct and use such specialized components as are required. In view of the foregoing descriptions, it should be apparent that the present invention represents a significant departure from the prior art in construction and operation. However, while particular embodiments of the present invention have been described herein in detail, it is to be understood that various alterations, modifications and substitutions can be made therein without departing in any way from the spirit and scope of the present invention, as defined in the claims which follow.

What is claimed is:

1. A method of detecting an off-line mode for a digital video interface including an active clock channel and a plurality of data channels, said method comprising:

detecting an activity of a clock signal on said clock channel by detecting a frequency of the clock signal;

determining whether the activity of the clock signal is valid based upon whether the frequency of the clock signal is operated within a desired frequency range;

turning on a first data channel of said plurality of data channels for a first predetermined period to determine an operation mode of a video signal transmitted on said first data channel if the activity of the clock signal is valid;

powering down all data channels for a second predetermined period if the operation mode of the video signal transmitted on said first data channel is determined to be invalid by referencing a look-up table; and activating a plurality of second data channels among said data channels according to the operation mode if the operation mode of the video signal transmitted on said first data channel is determined to be valid by referencing the look-up table.

2. The method of claim 1 wherein the activity of the clock signal is determined to be valid when the frequency of the clock signal is above 10 MHz.

3. The method of claim 1 wherein said video signal includes a horizontal synchronization signal, a vertical synchronization signal, and a pixel data signal.

4. The method of claim 1 wherein said video signal includes a display enable signal.

5. The method of claim 1 wherein said operation mode of the video signal is determined to be valid by detecting a frequency of a horizontal synchronization signal and a frequency of a vertical synchronization signal.

6. The method of claim 1 wherein said operation mode of the video signal is determined to be valid by referencing a frequency of a horizontal synchronization signal and a frequency of a vertical synchronization signal with a look-up table.

7. The method of claim 1 wherein the first predetermined period is less than the second predetermined period.

8. The method of claim 1 wherein the digital video interface is a Digital Visual Interface (DVI).

9. The method of claim 1 wherein the digital video interface is a High-Definition Multimedia Interface (HDMI).

10. The method of claim 1 wherein said turning off step further comprises a step of turning off the clock channel for the second predetermined period if the operation mode is determined as invalid.

11. A TMDS receiver, comprising:
a plurality of data channels, each data channel for receiving a video signal and each data channel comprising a channel decoder for decoding the video signal received by the corresponding data channel;
a clock channel, for receiving a clock signal;
an off-line mode detector, coupled to said clock channel and said decoders, for determining whether an activity of the clock signal is valid and for turning on a first data channel of the plurality of data channels for a first predetermined period to determine an operation mode of video signal transmitted on said first data channel if the activity of the clock signal is valid, and for determining whether the operation mode of video signal transmitting on said first data channel is valid and for activating a plurality of second data channels among the plurality of data channels according to the operation mode if the operation mode is determined as valid;
a mode detector for detecting an operation mode of said video signal;
a clock detector for detecting said activity of said clock signal by detecting a frequency of the clock signal and determining whether the activity of the clock signal is valid based upon whether the frequency of the clock signal is operated within a desired frequency range; and
a power down controller coupled to said mode detector and said clock detector,
wherein the power down controller enables the mode detector to determine the operation mode of said video signal transmitted through said turned-on first data channel, and then the power down controller turns off all decoders, the data channels and the clock channel for a second predetermined period when the operation mode of said video signal is determined as invalid by referencing a look-up table.

12. The TMDS receiver of claim 11
wherein said off-line mode detector is coupled to a micro controller, the micro controller enables the mode detector to determine the operation mode of said video signal transmitted through said turned on data channel during said first predetermined period, and then the micro controller signals the power down controller to turn off all decoders, the data channels and the clock channel for a second predetermined period when the operation mode of said video signal is determined as invalid by referencing the look-up table.

13. The TMDS receiver of claim 11 wherein the video signal comprises a horizontal synchronization signal, a vertical synchronization signal and a pixel data.

14. The TMDS receiver of claim 11 wherein the video signal comprises a display enable signal.

15. The TMDS receiver of claim 11 wherein the activity of said clock signal is determined to be valid when the frequency of said clock signal is above 10 MHz.

16. The TMDS receiver of claim 11 wherein the operation mode of said video signal indicates a display resolution and a display frequency of said video signal.

17. The TMDS receiver of claim 11 wherein the mode detector determines the operation mode of said video signal to be valid by detecting a frequency of a horizontal synchronization signal and a frequency of a vertical synchronization signal.

18. The TMDS receiver of claim 11 wherein the first predetermined period is no less than twice a period of a vertical synchronization signal.

19. The TMDS receiver of claim 11 wherein the first predetermined period is shorter than the second predetermined period.

20. The TMDS receiver of claim 11 wherein the mode detector determines the operation mode of said video signal by pixel-counting a pixel data.

21. The TMDS receiver of claim 11 wherein the digital video interface is a Digital Visual Interface (DVI).

22. The TMDS receiver of claim 11 wherein the digital video interface is a High-Definition Multimedia Interface (HDMI).

* * * * *